(12) United States Patent
Hacker et al.

(10) Patent No.: US 11,220,601 B2
(45) Date of Patent: Jan. 11, 2022

(54) ASPHALT COMPOSITIONS AND METHODS OF FORMING THE SAME

(71) Applicant: HONEYWELL INTERNATIONAL INC., Morris Plains, NJ (US)

(72) Inventors: Scott Martin Hacker, River Edge, NJ (US); Yonghong Ruan, Wayne, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 240 days.

(21) Appl. No.: 16/391,943

(22) Filed: Apr. 23, 2019

(65) Prior Publication Data

US 2020/0002229 A1 Jan. 2, 2020

Related U.S. Application Data

(60) Provisional application No. 62/690,592, filed on Jun. 27, 2018.

(51) Int. Cl.
| | |
|---|---|
| *C08L 95/00* | (2006.01) |
| *C04B 26/26* | (2006.01) |
| *C04B 24/26* | (2006.01) |
| *C04B 24/08* | (2006.01) |
| *C04B 111/20* | (2006.01) |
| *C04B 111/00* | (2006.01) |

(52) U.S. Cl.
CPC .............. *C08L 95/00* (2013.01); *C04B 24/08* (2013.01); *C04B 24/2611* (2013.01); *C04B 26/26* (2013.01); *C04B 2111/0075* (2013.01); *C04B 2111/2084* (2013.01)

(58) Field of Classification Search
None
See application file for complete search history.

(56) References Cited

U.S. PATENT DOCUMENTS

| 4,659,759 | A | 4/1987 | Jevanoff et al. |
| 7,745,518 | B2 | 6/2010 | Scholten |
| 9,523,003 | B2 | 12/2016 | Williams et al. |
| 9,605,152 | B2 | 3/2017 | Ruan et al. |
| 2003/0212168 | A1 | 11/2003 | White et al. |
| 2009/0163625 | A1 * | 6/2009 | Lang ................. C08L 95/00 524/68 |
| 2012/0196959 | A1 | 8/2012 | Hacker et al. |
| 2015/0191597 | A1 * | 7/2015 | Hacker ................ E01C 7/18 524/68 |
| 2016/0264464 | A1 | 9/2016 | Warner et al. |
| 2016/0362339 | A1 | 12/2016 | Franzen et al. |
| 2016/0376440 | A1 | 12/2016 | Naidoo et al. |
| 2017/0283615 | A1 | 10/2017 | Williams et al. |

FOREIGN PATENT DOCUMENTS

| EP | 1748055 A1 | 1/2007 | |
| KR | 20160011746 A | 2/2016 | |
| WO | WO-2015119842 A1 * | 8/2015 | ............. C04B 28/36 |
| WO | WO-2016138374 A1 * | 9/2016 | .......... C08L 23/0884 |
| WO | 2017/116831 A1 | 7/2017 | |

OTHER PUBLICATIONS

Honeywell Titan 7686 Data Sheet, Mar. 2013. (Year: 2013).*
Sun, Zhaojie, et al., "Properties of Asphalt Binder Modified by Bio-Oil Derived from Waste Cooking Oil," Construction and Building Materials 102, Jan. 2016, 496-504.
Elham H. Fini, Imad L. Al-Qadi, Zhanping You, Boubacar Zada & J. Mills-Beale (2012) Partial replacement of asphalt binder with bio-binder: characterisation and modification, International Journal of Pavement Engineering, 13:6, 515-522, DOI: 10.1080/10298436.2011.596937.
Fernandes, Monica Romero Santos, "Rheological Evaluation of Polymer-Modifies Asphalt Binders," Materials Research, vol. 11, No. 3, Aug. 5, 2008, p. 381-86.

\* cited by examiner

*Primary Examiner* — Christopher M Rodd
(74) *Attorney, Agent, or Firm* — Lorenz & Kopf, LLP

(57) ABSTRACT

An asphalt composition includes asphalt, a non-epoxidized oil chosen from flux oils, bio oils, recycled motor oils, liquid plasticizers, and combinations thereof, and a polyolefin. The polyolefin has a weight average molecular weight (Mw) of from about 1,000 to about 20,000 g/mol, an optional acid number of from about 10 to about 50 mg KOH/g, an optional saponification number of from about 10 to about 100 mg KOH/g, and a density of from about 0.92 to about 1 g/cm$^3$. The asphalt composition has a performance grade of PG (52 to 88) and (−22 to −40), wherein (52 to 88) is an average seven day maximum pavement design temperature in degrees Celsius and represents deformation resistance and (−22 to −40) is an average one day minimum pavement design temperature in degrees Celsius and represents thermal cracking resistance, each as determined using AASHTO M320.

20 Claims, No Drawings

ASPHALT COMPOSITIONS AND METHODS OF FORMING THE SAME

CROSS-REFERENCE TO RELATED APPLICATIONS

This application claims the benefit of U.S. Provisional Application No. 62/690,592, filed on Jun. 27, 2018, which is incorporated herein by reference in its entirety.

TECHNICAL FIELD

The present disclosure generally relates to asphalt compositions and methods of forming the same. More specifically, the asphalt composition includes asphalt, a non-epoxidized oil, and a polyolefin. The asphalt composition exhibits an unexpected increase in performance grade at both low and high temperatures and can be customized for particular applications.

BACKGROUND

Asphalt, or bitumen, is commonly collected or synthesized and refined for use in paving and roofing applications. The type of asphalt suitable for paving applications is commonly referred to as "paving grade asphalt," "paving asphalt," or "asphalt cement." Asphalt suitable for roofing applications is commonly referred to as "roofing flux," "flux asphalt," or simply "flux." In general, paving asphalt is harder than roofing flux.

The strength and durability of asphalt compositions depend on various factors including the properties of the materials used to form the asphalt compositions and the environmental conditions to which the asphalt compositions are exposed. Conventional asphalt compositions suffer from various drawbacks due to exposure to environmental conditions, such as, for example, cracking at low temperatures, fatigue cracking, and rutting at high temperatures.

To improve resistance of asphalt compositions to these and other problems, various materials may be used. For example, high temperature performance additives, e.g., plastomers and/or elastomers, and/or low temperature performance additives, may be incorporated into the asphalt compositions. The high temperature performance additives tend to increase the modulus of the asphalt compositions at higher temperatures to enable the asphalt compositions to resist permanent deformation and creep, while the low temperature performance additives tend to increase flexibility and ductility of the asphalt compositions at lower temperatures to enable the asphalt compositions to resist brittleness and cracking. Nevertheless, use of such materials tends to solve only one problem at a time while not improving, or even worsening, the other problem. For example, while low temperature cracking may be improved, high temperature rutting may not be improved or may even be made worse. The reverse can also be observed.

Accordingly, there remains an opportunity to simultaneously improve high temperature and low temperature performance of asphalt compositions. Additional beneficial features and characteristics of various asphalt compositions will become apparent from the subsequent detailed description and examples.

SUMMARY OF THE DISCLOSURE

This disclosure provides an asphalt composition that includes asphalt, a non-epoxidized oil, and a polyolefin. The asphalt is present in an amount of from about 85 to about 97 weight percent, based on a total weight of the composition. The non-epoxidized oil is chosen from flux oils, bio oils, recycled motor oils, liquid plasticizers, and combinations thereof and is present in an amount of from about 2 to about 10 weight percent, based on a total weight of the composition to improve thermal cracking resistance. The polyolefin is present in an amount of from about 1 to about 5 weight percent, based on a total weight of the composition to improve deformation resistance. The polyolefin has a weight average molecular weight (Mw) of from about 1,000 to about 20,000 g/mol, an optional acid number of from about 10 to about 50 mg KOH/g, an optional saponification number of from about 10 to about 100 mg KOH/g, and a density of from about 0.92 to about 1 g/cm$^3$. The asphalt composition has a performance grade of PG (52 to 88) and (−22 to −40), wherein (52 to 88) is an average seven day maximum pavement design temperature in degrees Celsius and represents deformation resistance and (−22 to −40) is an average one day minimum pavement design temperature in degrees Celsius and represents thermal cracking resistance. Each is determined using AASHTO M320. The combination of the non-epoxidized oil and the polyolefin allows for simultaneous improvement of both low and high temperature performance.

This disclosure also provides a method of forming the asphalt composition. The method includes the steps of providing the asphalt, providing the non-epoxidized oil, providing the polyolefin, and combining the asphalt, the non-epoxidized oil, and the polyolefin to form the asphalt composition.

DETAILED DESCRIPTION

The following detailed description is merely exemplary in nature and is not intended to limit the disclosure. Furthermore, there is no intention to be bound by any theory presented in the preceding background or the following detailed description.

Embodiments of the present disclosure are generally directed to asphalt compositions and methods for forming the same. For the sake of brevity, some conventional techniques related to asphalt composition formation and use may not be described in detail herein. Moreover, the various tasks and process steps described herein may be incorporated into a more comprehensive procedure or process having additional steps or functionality not described in detail herein. In particular, various steps in the manufacture and use of asphalt compositions are well-known and so, in the interest of brevity, many conventional steps will only be mentioned briefly herein or will be omitted entirely without providing the well-known process details.

This disclosure provides an asphalt composition (referred to as the "composition" below) that includes asphalt, a non-epoxidized oil, and a polyolefin, each of which is described in detail below. In various embodiments, the composition is, includes, consists essentially of, or consists of the asphalt, the non-epoxidized oil, and the polyolefin. Moreover, the composition may be, include, consist essentially of, or consist of the asphalt, the non-epoxidized oil, the polyolefin, and one or more additional components as described below. It is also contemplated that the composition may be free of, or include less than about 10, 5, 4, 3, 2, 1, 0.5, 0.1, 0.05, or 0.01, weight percent of, one or more of the components described below. In yet another embodiment, the composition consists essentially of the asphalt, corn oil, and oxidized high density polyethylene. The terminology "consists essentially of" describes that the composition is free of (or includes less than about 10, 5, 4, 3, 2, 1, 0.5, 0.1, 0.05, or 0.01, weight percent of) one or more polymers, additives, fillers, epoxidized oils, etc. The composition may also include less than about 10, 5, 4, 3, 2, 1, 0.5, 0.1, 0.05, or 0.01, weight percent of, epoxidized oils or be free of epoxidized oils. Similarly, the composition may include less than about 10, 5, 4, 3, 2, 1, 0.5, 0.1, 0.05, or 0.01, weight percent of, or be free of, epoxidized or non-epoxidized polyolefins, so long as a polyolefin of this disclosure is included in the composition. This disclosure also provides a method of forming the asphalt composition. The method is also described in greater detail below.

Asphalt:

The term "asphalt," as used herein, is typically as defined by ASTM D8 and is typically a dark brown to black cement-like material in which predominant constituents are bitumens that occur in nature or are obtained in petroleum processing. Asphalt characteristically includes saturates, aromatics, resins and asphaltenes. The terms "asphalt" and "bitumen" are often used interchangeably to refer to both natural and manufactured composition, all of which are expressly contemplated for use herein in various non-limiting embodiments.

The type of asphalt suitable for use herein is not particularly limited and may include any known in the art. For example, the asphalt may be or include any naturally occurring, synthetically manufactured or modified asphalt. Asphalt can be a combination of asphalts. Naturally occurring asphalt typically includes native rock asphalt, lake asphalt, and the like. Synthetically manufactured asphalt is often a byproduct of petroleum refining operations and includes air-blown asphalt, blended asphalt, cracked or residual asphalt, petroleum asphalt, propane asphalt, straight-run asphalt, thermal asphalt, and the like. Modified asphalt typically includes base asphalt (e.g., neat or unmodified asphalt that can be naturally occurring or synthetically manufactured) modified with elastomers, tackifiers, phosphoric acid, polyphosphoric acid, plastomers, ground tire rubber (GTR), reclaimed asphalt pavement (RAP), reclaimed asphalt shingles (RAS), and the like, or various combinations thereof. Furthermore, industry-grade asphalts, including but not limited to, paving-grade asphalts, can be used. Suitable paving-grade asphalts include, but not limited to, asphalts having any one of the following hardness grades: PG46-40, PG46-34, PG52-40, PG52-37, PG52-34, PG52-28, PG58-40, PG58-37, PG58-34, PG58-28, PG58-22, PG64-37, PG64-34, PG64-28, PG64-22, PG64-16, PG67-22, PG70-10, PG70-16, PG70-22, PG70-28, PG76-10, PG76-16, PG76-22, PG76-28, as defined by AASHTO M320. Additionally, these paving-grade asphalts can also meet AASHTO M332 which specifies multiple stress creep recovery (MSCR) grades following 4 types of traffic levels: standard (S), heavy (H), very heavy (V), and extremely heavy (E), e.g. PG58S-28, PG64H-22, PG70V-16, PG76E-10, etc. Additionally, it is contemplated that industry-grade asphalts, such as roof-grade asphalts, may be used. Suitable roofing-grade asphalts include, but not limited to, asphalts having any one of the following hardness grades: 0 decimillimeters penetration (dmm pen), 10 dmm pen, 20/30 dmm pen, 30/50 dmm pen, 35/50 dmm pen, 40/60 dmm pen, 50/70 deci-millimeters penetration (dmm pen), 60/90 dmm pen, 70/100 dmm pen, 80/110 dmm pen, 120/150 dmm pen, 100/150 dmm pen, 150/200 dmm pen, 200/300 dmm pen, and 300+dmm pen. Hardness grades are determined per the test method described in ASTM D5. In one embodiment, the following type(s) of asphalt are used: PG52-34, PG58-28, PG64-22, PG64-28.

The asphalt is present in the composition in an amount of from about 85 to about 97 weight percent based on a total weight of the composition. In various embodiments, the asphalt is present in an amount of from about 85 to about 95, about 80 to about 90, about 90 to about 95, about 90 to about 97, or about 95 to about 97, weight percent, based on a total weight of the composition. It is also contemplated that in various non-limiting embodiments the asphalt may be present in any amount or range of amounts, both whole and fractional, between and including those set forth above.

Non-Epoxidized Oil:

Referring now to the non-epoxidized oil present in the composition, the non-epoxidized oil is chosen from flux oils, bio oils, recycled motor oils, liquid plasticizers, and combinations thereof. These oils are suitable for blending with bitumen or asphalt to form a product of greater fluidity or softer consistency.

Bitumen in its natural state may be prone to low temperature cracking depending on environmental temperature conditions. Flux oils can help to make bitumen less susceptible to low temperature cracking. Suitable flux oils may be based on petroleum distillates and may be complex hydrocarbons. The flux oil may be described as an oil suitable for blending with bitumen or asphalt to form a product of greater fluidity and/or softer consistency. Moreover, the flux oil may be a non-volatile fraction of petroleum. In various embodiments, the flux oil may be any that is used to modify asphalt and is the final products in crude oil distillation. The flux oils may be non-volatile oils that are blended with asphalt as softeners. They may be aromatic, paraffinic, naphthenic, or mineral.

The bio-oil may be any known in the art. In various embodiments, the bio-oil is a dark-brown, mobile liquid derived from thermo-chemical processing of biomass. For asphalt pavements, oxidation can cause deterioration via long-term aging and eventually result in cracking. In various embodiments, the bio-oil is chosen from plant oils, animals oils, and combinations thereof. In other embodiments, the bio-oil is a plant oil. Suitable plant oils include, but are not limited to, vegetable oils, soybean oil, peanut oil, walnut oil, palm oil, palm kernel oil, sesame oil, sunflower oil, safflower oil, rapeseed oil, linseed oil, flax seed oil, colza oil, coconut oil, corn oil, cottonseed oil, olive oil, castor oil, false flax oil, hemp oil, mustard oil, radish oil, ramtil oil, rice bran oil, salicornia oil, tigernut oil, tung oil, etc., and combinations thereof. Typical vegetable oil used herein includes soybean oil, linseed oil, corn oil, flax seed oil, or rapeseed oil, and combinations thereof.

In one embodiment, the bio-oil may include oils isolated from plants, animals, and algae. Examples of plant-based oils may include but are not limited to soybean oil, linseed oil, canola oil, rapeseed oil, castor oil, tall oil, cottonseed oil, sunflower oil, palm oil, peanut oil, safflower oil, corn oil, corn stillage oil, lecithin (phospholipids) and combinations, distillates, derivatives, and crude streams thereof. Examples of animal-based oils may include but are not limited to animal fat (e.g., lard, tallow) and lecithin (phospholipids), and combinations, distillates, derivatives, and crude streams thereof. The bio-oil may also be a bio renewable oils such as partially hydrogenated oils, oils with conjugated bonds, and bodied oils wherein a heteroatom is not introduced, for example but not limited to, diacylglycerides, monoacylglycendes, free fatty acids (and distillate streams thereof), alkyl esters of fatty acids (e.g., methyl, ethyl, propyl, and butyl esters), diol and triol esters (e.g., ethylene glycol, propylene glycol, butylene glycol, trimethylolpropane), and mixtures and derivative streams thereof. An example of bio renewable oils may be waste cooking oil or other used oils.

In one embodiment, the non-epoxidized oil is corn oil. In another embodiment, the non-epoxidized oil is chosen from paraffin oils, aromatic oils, naphthenic oils, and combinations thereof.

The recycled motor oil may also be described as re-refined engine oil bottoms (REOB), vacuum tower asphalt extenders (VTAE), or luwa bottoms. This oil may be a non-distillate fraction from re-refining of waste engine oils (lubricating oils, or lube oils). In one embodiment, this oil is the highest boiling point fraction of the paraffinic lube oils.

The liquid plasticizers may be those that increase the plasticity or fluidity of the asphalt. Non-exclusive examples of plasticizers include hydrocarbon oils (e.g., paraffin, aromatic and naphthenic oils), long chain alkyl diesters (e.g., phthalic acid esters, such as dioctyl phthalate, and adipic acid esters, such as dioctyl adipate), sebacic acid esters, glycol, fatty acid, phosphoric and stearic esters, epoxy plasticizers (e.g., epoxidized soybean oil), polyether and polyester plasticizers, alkyl monoesters (e.g., butyl oleate), long chain partial ether esters (e.g., butyl cellosolve oleate), and other plasticizers known in the art.

The non-epoxidized oil is present in the composition in an amount of from about 2 to about 10 weight percent, based on a total weight of the composition. In various embodiments, the non-epoxidized oil is present in an amount of from about 2 to about 5, about 5 to about 10, about 2 to about 7, about 5 to about 7, or about 7 to about 10, weight percent, based on a total weight of the composition. It is also contemplated that in various non-limiting embodiments the non-epoxidized oil may be present in any amount or range of amounts, both whole and fractional, between and including those set forth above.

Without intending to be limited by any particular theory, it is believed that the non-epoxidized oil contributes to improvement of thermal cracking resistance because of the reduction of asphalt modulus, the reduction of the S-value and the increase of m-value as measured by AASHTO T-313/ASTM D6648 at low temperatures.

Polyolefin:

Referring now to the polyolefin, the polyolefin may be any known in the art. The polyolefin may be oxidized or non-oxidized. For example, the polyolefin may be oxidized or non-oxidized forms of any of polyethylene (PE), polypropylene (PP), polybutylene (PB), polymethylpentene (PMP), polybutene-1 (PB-1), polyolefin elastomers (POE), polyisobutylene (PIB), ethylene propylene rubber (EPR), ethylene propylene diene monomer rubbers (EPDM rubbers), and combinations thereof. Alternatively, the polyolefin may be described as a poly-alpha-olefin. In various embodiments, the polyolefin is chosen from a polyethylene homopolymer, a maleated polypropylene, an oxidized high density polyethylene, and combinations thereof. In one embodiment, the polyolefin is polyethylene homopolymer. In another embodiment, the polyolefin is a maleated polypropylene. In a further embodiment, the polyolefin is an oxidized high density polyethylene. In further embodiments, the polyolefin is a medium or low density polyolefin.

In other embodiments, the polyolefin is selected from the group consisting of polyethylene (PE) homopolymer, low density polyethylene homopolymer (LDPE), linear low density polyethylene homopolymer (LLDPE), high density polyethylene homopolymer oxidized low density polyethylene homopolymer (Ox LDPE), oxidized mid-density polyethylene homopolymer (Ox MDPE), oxidized high density polyethylene homopolymer (Ox HDPE), polypropylene (PP) homopolymer, ethylene-acrylic acid (EAA) co-polymer, ethylene-vinyl acetate (EVA) co-polymer, ethylene maleic anhydride (MAPE) co-polymer, propylene maleic anhydride (MAPP) co-polymer, Fischer-Tropsch wax (FT wax), and mixtures thereof.

The polyolefin may be oxidized by any method known in the art. One indicator for the degree of oxidation is polyolefin's acid number, measured by method ASTM D1386. In various embodiments, the polyolefin is an oxidized polyethylene. For example, the oxidized polyethylene may be any oxidized polyethylene, oxidized high density polyethylene, oxidized mid-density polyethylene, oxidized low density polyethylene, oxidized linear low density polyethylene, and combinations thereof.

The polyolefin has a weight average molecular weight (Mw) of from about 1,000 to about 20,000 g/mol, an optional acid number of from about 10 to about 50 mg KOH/g, an optional saponification number of from about 10 to about 100 mg KOH/g, and a density of from about 0.92 to about 1 g/cm$^3$.

In various embodiments, the polyolefin has a weight average molecular weight (Mw) of from about 1,000 to about 5,000, about 5,000 to about 7,500, about 7,500 to about 10,000, about 8,000 to about 12,000, about 10,000 to about 12,500, about 12,500 to about 15,000, about 15,000 to about 17,500, about 17,500 to about 20,000, about 6,000 to about 10,000, about 10,000 to about 15,000, about 15,000 to about 20,000, g/mol, etc. It is also contemplated that in various non-limiting embodiments the weight average molecular weight may be any value or range of values, both whole and fractional, between and including those set forth above.

The molecular weights described herein are typically determined by gel permeation chromatography (GPC), which is a technique generally known in the art. For the purpose of GPC, the sample to be measured is dissolved in 1,2,4-trichlorobenzene at 140° C. at a concentration of 2.0 mg/ml. The solution (200 uL) is injected into the GPC containing two PLgel 5 μm Mixed-D (300×7.5 mm) columns held at 140° C. with a flow rate of 1.0 mL/minute. The instrument is equipped with two detectors (refractive index and viscosity detector). The molecular weight (weight average molecular weight, Mw) can be determined using a calibration curve generated from a set of linear polyethylene narrow Mw standards.

In other embodiments, the polyolefin has an optional acid number of from about 15 to about 45, about 20 to about 40, about 25 to about 35, about 25 to about 30, about 30 to about 35, 24 to about 27, etc., mg KOH/g. It is also contemplated that in various non-limiting embodiments the acid number may be any value or range of values, both whole and fractional, between and including those set forth above. The acid number is optional because it is relevant to polyolefins that are, for example, oxidized. The degree of oxidation, e.g., carboxyl group content, of the polyolefin may be characterized by titrating a hot xylenes solution of the polyolefin with a 0.1 N alcoholic potassium hydroxide (KOH) solution to a visual "pink" end point using phenolphthalein as an indicator to determine the total acid content or acid number of the polyolefin.

Similarly, in still other embodiments, the polyolefin has an optional saponification number of from about 15 to about 95, about 25 to about 95, about 50 to about 95, about 75 to about 95, about 15 to about 25, about 15 to about 50, about 25 to about 75, or about 25 to about 50, mg KOH/g. It is also contemplated that in various non-limiting embodiments the saponification number may be any value or range of values, both whole and fractional, between and including those set forth above. The saponification number is optional because it is relevant to polyolefins that are, for example, maleated. In still other embodiments, the polyolefin has an acid number of from about 14 to about 32 mg KOH/g or a saponification number of from about 75 to about 95 mg KOH/g. In particular, the saponification number is determined by refluxing ~0.3 gm of maleated polymer in 150 mL of xylenes, 5 mL of fresh methyl ethyl ketone and seven drops of water for 15 minutes. The solution is allowed to cool slightly and 10 mL of isopropyl alcohol and 3-5 drops of a phenolphthalein indicator solution are added. The solution is titrated with a standardized 0.0535N KOH/isopropyl alcohol solution drop wise until a persistent faint pink solution is reached. A blank should be run to compensate for acidic impurities in the various solvents.

In still other embodiments, the polyolefin has a density of about 0.92, 0.93, 0.94, 0.95, 0.96, 0.97, 0.98, 0.99, or 1, g/cm$^3$. In other embodiments, the polyolefin has a density of from about 0.92 to about 0.95, from about 0.95 to 0.98, from about 0.97 to about 1, or from about 0.98 to about 1, g/cm$^3$. It is also contemplated that in various non-limiting embodiments the density may be any value or range of values, both whole and fractional, between and including those set forth above. The density can be measured using the method in ASTM D1505.

The polyolefin is present in an amount of from about 1 to about 5 weight percent based on a total weight of the composition to improve deformation resistance. In various embodiments, the polyolefin is present in about 1, about 1.5, about 2, about 2.5, about 3, about 3.5, about 4, about 4.5, or about 5, weight percent based on a total weight of the composition. In still other embodiments, the polyolefin is present in an amount of from about 1 to about 5, about 2 to about 3, about 1.5, to about 3.5, about 1.5 to about 2.5, or about 1.5 to about 3, weight percent based on a total weight of the composition. It is also contemplated that in various non-limiting embodiments the density may be any value or range of values, both whole and fractional, between and including those set forth above.

In one embodiment, the polyolefin is an oxidized high density polyethylene having a weight average molecular weight (Mw) of from about 8,000 to about 12,000 g/mol, an acid number of from about 24 to about 27 mg KOH/g, and a density of from about 0.97 to about 1.0 g/cm$^3$. In another embodiment, the polyolefin is a low density polyethylene homopolymer having a weight average molecular weight (Mw) of from about 5,000 to about 7,000 g/mol, and a density of from about 0.92 to about 0.94 g/cm$^3$. In a further embodiment, the polyolefin is an oxidized high density polyethylene having a weight average molecular weight (Mw) of from about 8,000 to about 12,000 g/mol, and a density of from about 0.97 to about 1.0 g/cm$^3$. In a still further embodiment, the polyolefin is a maleated polypropylene having a weight average molecular weight (Mw) of from about 7,000 to about 11,000 g/mol, a saponification number of about 75 to about 95 mg KOH/g, and a density of from about 0.92 to about 0.94 g/cm$^3$.

Without intending to be limited by any particular theory, it is believed that the polyolefin contributes to improvement of deformation resistance because it forms small crystallites that reinforce the bitumen and/or help crystallize portions of the bitumen to help increase the high temperature properties of the bitumen.

Performance Grade:

The composition has a performance grade of PG (52 to 88) and (−22 to −40). In other words, the first value of (52 to 88) is a number of 52, 58, 64, 70, 76, 82, or 88. The nomenclature (52 to 88) is an average seven day maximum pavement design temperature in degrees Celsius and represents rut resistance. The second value (−22 to −40) is a number of −22, −28, −34, or −40. The nomenclature (−22 to −40) is an average one day minimum pavement design temperature in degrees Celsius and represents thermal cracking resistance. Each value is determined using AASHTO M320. It is also contemplated that one or both values may be determined using DSR tests AASHTO T-315/ASTM D7175 and/or BBR tests AASHTO T-313/ASTM D6648.

In various embodiments, the composition has a performance grade of 52-28; or 52-34; or 52-37, or 52-40; or 58-28; or 58-34; or 58-37, or 58-40; or 64-28; or 64-34; or 64-37, or 64-40; or 70-28; or 70-34; or 70-40; or 76-28; or 76-34; or 76-40; or 82-28; or 82-34; or 82-40; 88-28, 88-34, or 88-40. In various embodiments, the composition has a performance grade of PG (58 to 88) and (−28 to −40). These performance grades can be customized based on geographical location of use of the compositions, etc. It is also contemplated that the composition may have an S, H, V, or E grade designation, as is understood in the art. These letter grades may be determined using AASHTO M332 and/or MSCR test: AASHTO T-350/ASTM D7405. It is also contemplated that in various non-limiting embodiments the performance grade may be any individual or range of the aforementioned values and/or letter grades, between and including those set forth above.

Additives:

In various embodiments, the composition also includes one or more additives. In one embodiment, the one or more additives is chosen from plastomers, elastomers, etc. Plastomers and elastomers can be jointly described herein as "polymers." In various embodiments, the composition includes one or more of these polymers in an amount of from about 0.5 to about 30 wt. %, based on the total weight of the composition. Non-limiting examples of such polymers include natural or synthetic rubbers including ground tire rubber (GTR), devulcanized GTR, butyl rubber, styrene/butadiene rubber (SBR), styrene/ethylene/butadiene/styrene terpolymers (SEBS), polybutadiene, polyisoprene, ethylene/propylene/diene (EPDM) terpolymers, ethylene/n-butyl acrylate/glycidyl methacrylate terpolymers, and styrene/conjugated diene block or random copolymers, such as, for example, styrene/butadiene including styrene/butadiene/styrene copolymer (SBS), styrene/isoprene, styrene/isoprene/styrene (SIS) and styrene/isoprene-butadiene block copolymer. The block copolymers may be branched or linear and may be a diblock, triblock, tetrablock or multiblock copolymer.

In other embodiments, the one or more additives is chosen from waxes, polyphosphoric acids, additional plasticizers, anti-oxidants, tackifiers, processing aids, UV protecting additives, etc., and combinations thereof. Exemplary waxes include ethylene bis-stearamide wax (EBS), Fischer-Tropsch wax (FT), oxidized Fischer-Tropsch wax (FTO), polyolefin waxes such as polyethylene wax (PE), oxidized polyethylene wax (OxPE), polypropylene wax, polypropylene/polyethylene wax, alcohol wax, silicone wax, petroleum waxes such as microcrystalline wax or paraffin wax, and other synthetic waxes. Exemplary additional plasticizers include long chain alkyl diesters (e.g. phthalic acid esters, such as dioctyl phthalate, and adipic acid esters, such as dioctyl adipate), sebacic acid esters, glycol, fatty acid, phosphoric and stearic esters, epoxy plasticizers (e.g. epoxidized soybean oil), polyether and polyester plasticizers (which may also be polymers), alkyl monoesters (e.g. butyl oleate), long chain partial ether esters (e.g. butyl cellosolve oleate), and others. Exemplary tackifiers include rosins and their derivatives; terpenes and modified terpenes; aliphatic, cycloaliphatic and aromatic resins (C5 aliphatic resins, C9 aromatic resins, and C5/C9 aliphatic/aromatic resins); hydrogenated hydrocarbon resins; terpene-phenol resins; and combinations thereof.

Method of Forming the Composition:

This disclosure also provides a method of forming the asphalt composition. The method includes the steps of providing the asphalt, providing the non-epoxidized oil, providing the polyolefin, and combining the asphalt, the non-epoxidized oil, and the polyolefin to form the asphalt composition. The asphalt composition formed by this method may be any described above.

In various embodiments, any one or more of the steps of providing may be further defined as supplying, procuring, etc. One of skill in the art will choose appropriate amounts and techniques for providing the aforementioned components. Moreover, the method may include the step of providing any one or more of the additives described above and may include combining the one or more additives with the asphalt, the non-epoxidized oil, and the polyolefin. Any one or more of the aforementioned components may be combined together in whole or in-part and in any order selected by one of skill in the art. In other words, all orders of addition are hereby expressly contemplated for use in various non-limiting embodiments. In various embodiments, the step of combining is performed at suitable temperatures and may including agitating/agitation to thoroughly mix the components. In some embodiments, the step of combining is further defined as mixing and may be performed at a temperature of from about 75° C. to about 200° C. for a time of from about 30 minutes to about 8 hours. Furthermore, the step of combining or mixing may be performed, for example, using a low or high shear mixer at a speed of from about 5 revolutions per minute (RPM) to about 5,000 RPM.

This disclosure also provides a method for preparing an asphalt paving material. The method includes the step of mixing the asphalt composition described above and an aggregate at conditions effective to form the asphalt paving material, wherein the asphalt composition is present in an amount of from about 3 to about 8 wt. % of the asphalt paving material and the aggregate is present in an amount of from about 92 to about 97 wt. % of the asphalt paving material. The aggregate may be any known in the art. Similarly, the asphalt composition may be present in any amount between about 3 and about 8 wt. %, e.g., 3.5, 4, 4.5, 5, 5.5, 6, 6.5, 7, or 7.5, wt. %, based on a total weight of the asphalt paving material. The aggregate may be present in any amount between about 92 and about 97 wt. %, e.g., 92.5, 93, 93.5, 94, 94.5, 95, 95.5, 96, or 96.5, wt. %, based on a total weight of the asphalt paving material.

EXAMPLES

A series of compositions (Compositions 2, 4, 5, 6, 7, 9, and 12) are formed according to this disclosure. A series of comparative compositions (Comparative Compositions 1, 3, 8, 10, and 11) are also formed but not according to this disclosure.

More specifically, the Compositions and Comparative Compositions are evaluated to determine performance grade according to AASHTO M320. The results of these evaluations are set forth in Table 1 below.

TABLE 1

|  | Comparative Composition 1 | Composition 2 |
|---|---|---|
| PG 58-28 Base Asphalt | 100.0% | 94.5% |
| Corn Oil |  | 4.0% |
| Polyolefin 2 |  | 1.5% |
| Total | 1.00 | 1.00 |
| Actual PG Grade | 59.3-29.4 | 61.2-34.8 |
| Commercial PG Grade | 58-28 | 58-34 |

|  | Comparative Composition 3 | Composition 4 |
|---|---|---|
| PG 64-22 Base Asphalt | 100.0% | 96.0% |
| Corn Oil |  | 2.5% |
| Polyolefin 2 |  | 1.5% |
| Total | 1.00 | 1.00 |
| Actual PG Grade | 65.2-23.9 | 65.2-28.8 |
| Commercial PG Grade | 64-22 | 64-28 |

|  | Comparative Composition 3 | Composition 5 |
|---|---|---|
| PG 64-22 Base Asphalt | 100.0% | 91.0% |
| Corn Oil |  | 6.0% |
| Polyolefin 2 |  | 3.0% |
| Total | 1.00 | 1.00 |
| Actual PG Grade | 65.2-23.9 | 64.5-34.3 |
| Commercial PG Grade | 64-22 | 64-34 |

|  | Comparative Composition 3 | Composition 6 |
|---|---|---|
| PG 64-22 Base Asphalt | 100.0% | 95.0% |
| Corn Oil |  | 3.0% |
| Polyolefin 1 |  | 2.0% |
| Total | 1.00 | 1.00 |
| Actual PG Grade | 65.2-23.9 | 65.6-29.7 |
| Commercial PG Grade | 64-22 | 64-28 |

|  | Comparative Composition 1 | Composition 7 |
|---|---|---|
| PG 58-28 Base Asphalt | 100.0% | 93.0% |
| Corn Oil |  | 5.0% |
| Polyolefin 1 |  | 2.0% |
| Total | 1.00 | 1.00 |
| Actual PG Grade | 59.3-29.4 | 58.1-37.6 |
| Commercial PG Grade | 58-28 | 58-34 |

|  | Comparative Composition 8 | Composition 9 |
|---|---|---|
| PG 52-34 Base Asphalt | 100% | 95.0% |
| Flux Oil |  | 3.0% |
| Polyolefin 1 |  | 1.2% |
| Polyolefin 3 |  | 0.8% |
| Total | 1.00 | 1.00 |
| Actual PG Grade | 54.7-35.1 | 60.3-37.6 |
| Commercial PG Grade | 52-34 | 58-37 |

TABLE 1-continued

| Composition | Comparative Composition 1 | Comparative Composition 10 | Comparative Composition 11 |
|---|---|---|---|
| PG 58-28 Base Asphalt | 100% | 98.0% | 95.0% |
| Bio-Oil | | | 5.0% |
| Polyolefin 2 | | 2.0% | |
| Total | 1.00 | 1.00 | 1.00 |
| Actual PG Grade | 59.3-29.4 | 67.4-29.5 | 50.6-36.6 |
| Commercial PG Grade | 58-28 | 64-28 | 46-34 |

| Composition | Comparative Composition 1 | Composition 12 |
|---|---|---|
| PG 58-28 Base Asphalt | 100% | 93.0% |
| Bio-Oil | | 5.0% |
| Polyolefin 2 | | 2.0% |
| Total | 1.00 | 1.00 |
| Actual PG Grade | 59.3-29.4 | 66.6-34 |
| Commercial PG Grade | 58-28 | 64-34 |

PG 58-28 Base Asphalt is commercially available from Flint Hills resources.

PG 64-22 Base Asphalt is commercially available from Flint Hills resources.

Polyolefin 1 is a low density polyethylene homopolymer having a weight average molecular weight (Mw) of from about 5,000 to about 7,000 g/mol, and a density of from about 0.92 to about 0.94 g/cm$^3$ Polyolefin 2 is an oxidized high density polyethylene having a weight average molecular weight (Mw) of from about 8,000 to about 12,000 g/mol, an acid number of from about 24 to about 27 mg KOH/g, and a density of from about 0.97 to about 1.0 g/cm$^3$ Polyolefin 3 is a maleated polypropylene having a weight average molecular weight (Mw) of from about 7,000 to about 11,000 g/mol, a saponification number of 75-95 mg KOH/g, and a density of from about 0.92 to about 0.94 g/cm$^3$.

Corn oil is Jive™, commercially available from Poet.

Flux oil is commercially available from Hollyfrontier Refining & Marketing, LLC under the trade name of HYDROLENE®.

Actual PG grade refers to the performance grade as analytically determined using AASHTO M320.

Commercial PG grade refers to the commercial performance grade designation that corresponds to the actual PG grade.

Examples 2, 7 and 9 demonstrate how a PG 58-34 can be produced, by starting from either a PG 58-28 (examples 2 and 7) or a PG 52-34. In the former case the high temperature PG is maintained while the low temperature is dropped, whereas in the latter case the high temperature grade is raised while maintaining the low end. Examples 2 and 7 also demonstrate how different amounts of the oil and polyolefins can make a higher high temperature true, or actual grade (example 2) or make a lower low temperature PG true, or actual grade (example 7). Example 9 demonstrates the use of a different oil and a combination of polyolefins to raise the high end while maintaining the low end.

Examples 4 and 6 demonstrate the production of a PG 64-28 from readily available PG 64-22. In both cases corn oil was used to modify the low end, whereas different polyolefins were used to maintain the high temperature grade of PG64.

Example 5 demonstrates the possibility of dropping the low temperature by two grades, from a PG64-22 to a PG64-34.

Example 10 demonstrates 2% polyolefin 2 by itself only raised the high temperature grade (from PG58 to PG64) but did not lower the low temperature grade. Example 11 demonstrates 5% corn oil itself only lowered the low temperature grade (from PG-28 to PG-34) but did not raise the high temperature grade (actually it lowered the high temperature grade from PG58 to PG46). Example 12 demonstrates when polyolefin and corn oil used together, they raised the high temperature PG grade (from PG58 to PG64) and lowered the low temperature PG grade (from PG-28 to PG-34) simultaneously.

The results set forth in Table 1 demonstrate that combinations of oil and polyolefins can lower the low temperature PG grade while maintaining the high temperature grade, or raising the high temperature PG grade while maintaining the low end, or raising the high temperature PG grade and lowering the low temperature PG grade simultaneously. Table 1 also demonstrates that different polyolefins and different oils can fulfill these various asphalt performance improvement requirements.

In various embodiments, any and all combinations of the aforementioned components are hereby expressly contemplated even if not described together in a single paragraph or section. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. An asphalt composition comprising:
   a base asphalt present in an amount of from about 91 to about 96 weight percent, based on a total weight of said composition and chosen from performance grades PG58-28, PG 64-22, PG 52-34, and combinations thereof;
   a non-epoxidized oil chosen from flux oil, corn oil, and combinations thereof, and present in an amount of from about 2.5 to about 5 weight percent, based on a total weight of said composition to improve thermal cracking resistance; and
   at least one polyolefin present in a total amount of from about 1.2 to about 3 weight percent, based on a total weight of said composition to improve deformation resistance;
   wherein said polyolefin is
      a low density polyethylene homopolymer having a weight average molecular weight (Mw) of from about 5,000 to about 7,000 g/mol, and a density of from about 0.92 to about 0.94 g/cm$^3$; or
      an oxidized high density polyethylene having a weight average molecular weight (Mw) of from about 8,000 to about 12,000 g/mol, an acid number of from about 24 to about 27 mg KOH/g, and a density of from about 0.97 to about 1.0 g/cm$^3$;
      and wherein the asphalt composition may optionally include about 0.8 weight percent of a maleated polypropylene based on a total weight of said composition, wherein said maleated polypropylene has a weight average molecular weight (Mw) of from about 7,000 to about 11,000 g/mol, a saponification number of 75-95 mg KOH/g, and a density of from about 0.92 to about 0.94 g/cm$^3$, and wherein said asphalt composition has a performance grade of about PG (58.1 to 66.6) and (−28.8 to −37.6), wherein (58.1 to 66.6) is an average seven day maximum pavement design temperature in degrees Celsius and represents deformation resistance and (−28.8 to −37.6) is an average one day minimum pavement design temperature in degrees Celsius and represents thermal cracking resistance, each as determined using AASHTO M320.

2. The asphalt composition of claim 1 wherein said polyolefin is the oxidized high density polyethylene having the weight average molecular weight (Mw) of from about 8,000 to about 12,000 g/mol, the acid number of from about 24 to about 27 mg KOH/g, and the density of from about 0.97 to about 1.0 g/cm$^3$.

3. The asphalt composition of claim 1 wherein said polyolefin is the low density polyethylene homopolymer having the weight average molecular weight (Mw) of from about 5,000 to about 7,000 g/mol, and the density of from about 0.92 to about 0.94 g/cm$^3$.

4. The asphalt composition of claim 1 comprising said maleated polypropylene having the weight average molecular weight (Mw) of from about 7,000 to about 11,000 g/mol, the saponification number of about 75 to about 95 mg KOH/g, and the density of from about 0.92 to about 0.94 g/cm$^3$.

5. The asphalt composition of claim 1 wherein said non-epoxidized oil is the corn oil.

6. The asphalt composition of claim 1 wherein said non-epoxidized oil is the flux oil.

7. The asphalt composition of claim 1 having an S, H, V, or E grade, as determined using AASHTO M332.

8. The asphalt composition of claim 1 that is free of epoxidized oils.

9. A method of forming an asphalt composition, said method comprising the steps of:
providing a base asphalt chosen from performance grades PG58-28, PG 64-22, PG 52-34, and combinations thereof;
providing a non-epoxidized oil chosen from flux oils, corn oil, and combinations thereof,
providing a polyolefin, and
combining the base asphalt, the non-epoxidized oil, and the polyolefin to form the asphalt composition,
wherein the asphalt composition comprises the base asphalt in an amount of from about 91 to about 96 weight percent, based on a total weight of the composition, the non-epoxidized oil in an amount of from about 2.5 to about 5 weight percent, based on a total weight of the composition to improve thermal cracking resistance, and the polyolefin in an amount of from about 1.2 to about 3 weight percent, based on a total weight of the composition to improve deformation resistance;
wherein the polyolefin is
a low density polyethylene homopolymer having a weight average molecular weight (Mw) of from about 5,000 to about 7,000 g/mol, and a density of from about 0.92 to about 0.94 g/cm$^3$; or
an oxidized high density polyethylene having a weight average molecular weight (Mw) of from about 8,000 to about 12,000 g/mol, an acid number of from about 24 to about 27 mg KOH/g, and a density of from about 0.97 to about 1.0 g/cm$^3$;

and wherein the asphalt composition may optionally include about 0.8 weight percent of a maleated polypropylene based on a total weight of said composition, wherein said maleated polypropylene has a weight average molecular weight (Mw) of from about 7,000 to about 11,000 g/mol, a saponification number of 75-95 mg KOH/g, and a density of from about 0.92 to about 0.94 g/cm$^3$, and wherein the asphalt composition has a performance grade of about PG (58.1 to 66.6) and (−28.8 to −37.6), wherein (58.1 to 66.6) is an average seven day maximum pavement design temperature in degrees Celsius and represents deformation resistance and (−28.8 to −37.6) is an average one day minimum pavement design temperature in degrees Celsius and represents thermal cracking resistance, each as determined using AASHTO M320.

10. The method of claim 9 wherein the polyolefin is the oxidized high density polyethylene having the weight average molecular weight (Mw) of from about 8,000 to about 12,000 g/mol, the acid number of from about 24 to about 26 mg KOH/g, and the density of from about 0.97 to about 1.0 g/cm$^3$.

11. An asphalt composition formed from the method of claim 9.

12. A method for preparing an asphalt paving material, the method comprising the step of mixing the asphalt composition of claim 1 and an aggregate at conditions effective to form the asphalt paving material, wherein the asphalt composition is present in an amount of from about 3 to about 8 wt. % of the asphalt paving material and the aggregate is present in an amount of from about 92 to about 97 wt. % of the asphalt paving material.

13. The method of claim 9 wherein the polyolefin is the low density polyethylene homopolymer having the weight average molecular weight (Mw) of from about 5,000 to about 7,000 g/mol, and the density of from about 0.92 to about 0.94 g/cm$^3$.

14. The method of claim 9 wherein the composition comprises the maleated polypropylene having the weight average molecular weight (Mw) of from about 7,000 to about 11,000 g/mol, the saponification number of about 75 to about 95 mg KOH/g, and the density of from about 0.92 to about 0.94 g/cm$^3$.

15. The composition of claim 1 wherein
I. the base asphalt is PG 58-28 present in an amount of about 94.5 weight percent based on a total weight of said composition; the non-epoxidized oil is corn oil present in an amount of about 4 weight percent based on a total weight of said composition; the polyolefin is the oxidized high density polyethylene having the weight average molecular weight (Mw) of from about 8,000 to about 12,000 g/mol, the acid number of from about 24 to about 27 mg KOH/g, and the density of from about 0.97 to about 1.0 g/cm$^3$ present in an amount of about 1.5 weight percent based on a total weight of said composition; and the composition has a performance grade of PG 61.2-34.8; or
II. the base asphalt is PG 64-22 present in an amount of about 96 weight percent based on a total weight of said composition; the non-epoxidized oil is corn oil present in an amount of about 2.5 weight percent based on a total weight of said composition; the polyolefin is the oxidized high density polyethylene having the weight average molecular weight (Mw) of from about 8,000 to about 12,000 g/mol, the acid number of from about 24 to about 27 mg KOH/g, and the density of from about 0.97 to about 1.0 g/cm³ present in an amount of about 1.5 weight percent based on a total weight of said composition; and the composition has a performance grade of PG 65.2-28.8; or III. the base asphalt is PG 64-22 present in an amount of about 91 weight percent based on a total weight of said composition; the non-epoxidized oil is corn oil present in an amount of about 6 weight percent based on a total weight of said composition; the polyolefin is the oxidized high density polyethylene having the weight average molecular weight (Mw) of from about 8,000 to about 12,000 g/mol, the acid number of from about 24 to about 27 mg KOH/g, and the density of from about 0.97 to about 1.0 g/cm³ present in an amount of about 3 weight percent based on a total weight of said composition; and the composition has a performance grade of PG 64.5-34.3; or IV. the base asphalt is PG 64-22 present in an amount of about 95 weight percent based on a total weight of said composition; the non-epoxidized oil is corn oil present in an amount of about 3 weight percent based on a total weight of said composition; the polyolefin is the low density polyethylene homopolymer having the weight average molecular weight (Mw) of from about 5,000 to about 7,000 g/mol, and the density of from about 0.92 to about 0.94 g/cm³ present in an amount of about 2 weight percent based on a total weight of said composition; and the composition has a performance grade of PG 65.6-29.7; or V. the base asphalt is PG 58-28 present in an amount of about 93 weight percent based on a total weight of said composition; the non-epoxidized oil is corn oil present in an amount of about 5 weight percent based on a total weight of said composition; the polyolefin is the low density polyethylene homopolymer having the weight average molecular weight (Mw) of from about 5,000 to about 7,000 g/mol, and the density of from about 0.92 to about 0.94 g/cm³ present in an amount of about 2 weight percent based on a total weight of said composition; and the composition has a performance grade of PG 58.1-37.6; or VI. the base asphalt is PG 52-34 present in an amount of about 95 weight percent based on a total weight of said composition; the non-epoxidized oil is flux oil present in an amount of about 3 weight percent based on a total weight of said composition; the polyolefin is the low density polyethylene homopolymer having the weight average molecular weight (Mw) of from about 5,000 to about 7,000 g/mol, and the density of from about 0.92 to about 0.94 g/cm³ present in an amount of about 1.2 weight percent based on a total weight of said composition; the composition further comprises about 0.8 weight percent of the maleated polypropylene based on a total weight of said composition, the and the composition has a performance grade of PG 60.3-37.6; or VII. the base asphalt is PG 58-28 present in an amount of about 93 weight percent based on a total weight of said composition; the non-epoxidized oil is corn oil present in an amount of about 5 weight percent based on a total weight of said composition; the polyolefin is the oxidized high density polyethylene having the weight average molecular weight (Mw) of from about 8,000 to about 12,000 g/mol, the acid number of from about 24 to about 27 mg KOH/g, and the density of from about 0.97 to about 1.0 g/cm³ present in an amount of about 2 weight percent based on a total weight of said composition; and the composition has a performance grade of PG 66.6-34.

16. The composition of claim 8 wherein

I. the base asphalt is PG 58-28 present in an amount of about 94.5 weight percent based on a total weight of said composition; the non-epoxidized oil is corn oil present in an amount of about 4 weight percent based on a total weight of said composition; the polyolefin is the oxidized high density polyethylene having the weight average molecular weight (Mw) of from about 8,000 to about 12,000 g/mol, the acid number of from about 24 to about 27 mg KOH/g, and the density of from about 0.97 to about 1.0 g/cm³ present in an amount of about 1.5 weight percent based on a total weight of said composition; and the composition has a performance grade of PG 61.2-34.8; or II. the base asphalt is PG 64-22 present in an amount of about 96 weight percent based on a total weight of said composition; the non-epoxidized oil is corn oil present in an amount of about 2.5 weight percent based on a total weight of said composition; the polyolefin is the oxidized high density polyethylene having the weight average molecular weight (Mw) of from about 8,000 to about 12,000 g/mol, the acid number of from about 24 to about 27 mg KOH/g, and the density of from about 0.97 to about 1.0 g/cm³ present in an amount of about 1.5 weight percent based on a total weight of said composition; and the composition has a performance grade of PG 65.2-28.8; or III. the base asphalt is PG 64-22 present in an amount of about 91 weight percent based on a total weight of said composition; the non-epoxidized oil is corn oil present in an amount of about 6 weight percent based on a total weight of said composition; the polyolefin is the oxidized high density polyethylene having the weight average molecular weight (Mw) of from about 8,000 to about 12,000 g/mol, the acid number of from about 24 to about 27 mg KOH/g, and the density of from about 0.97 to about 1.0 g/cm³ present in an amount of about 3 weight percent based on a total weight of said composition; and the composition has a performance grade of PG 64.5-34.3; or IV. the base asphalt is PG 64-22 present in an amount of about 95 weight percent based on a total weight of said composition; the non-epoxidized oil is corn oil present in an amount of about 3 weight percent based on a total weight of said composition; the polyolefin is the low density polyethylene homopolymer having the weight average molecular weight (Mw) of from about 5,000 to about 7,000 g/mol, and the density of from about 0.92 to about 0.94 g/cm³ present in an amount of about 2 weight percent based on a total weight of said composition; and the composition has a performance grade of PG 65.6-29.7; or V. the base asphalt is PG 58-28 present in an amount of about 93 weight percent based on a total weight of said composition; the non-epoxidized oil is corn oil present in an amount of about 5 weight percent based on a total weight of said composition; the polyolefin is the low density polyethylene homopolymer having the weight average molecular weight (Mw) of from about 5,000 to about 7,000 g/mol, and the density of from about 0.92 to about 0.94 g/cm³ present in an amount of about 2 weight percent based on a total weight of said composition; and the composition has a performance grade of PG 58.1-37.6; or VI. the base asphalt is PG 52-34 present in an amount of about 95 weight percent based on a total weight of said composition; the non-epoxidized oil is flux oil present in an amount of about 3 weight percent based on a total weight of said composition; the polyolefin is the low density polyethylene homopolymer having the weight average molecular weight (Mw) of from about 5,000 to about 7,000 g/mol, and the density of from about 0.92 to about 0.94 g/cm$^3$ present in an amount of about 1.2 weight percent based on a total weight of said composition; the composition further comprises about 0.8 weight percent of the maleated polypropylene based on a total weight of said composition, the and the composition has a performance grade of PG 60.3-37.6; or VII. the base asphalt is PG 58-28 present in an amount of about 93 weight percent based on a total weight of said composition; the non-epoxidized oil is corn oil present in an amount of about 5 weight percent based on a total weight of said composition; the polyolefin is the oxidized high density polyethylene having the weight average molecular weight (Mw) of from about 8,000 to about 12,000 g/mol, the acid number of from about 24 to about 27 mg KOH/g, and the density of from about 0.97 to about 1.0 g/cm$^3$ present in an amount of about 2 weight percent based on a total weight of said composition; and the composition has a performance grade of PG 66.6-34.

17. The method of claim 9 wherein

I. the base asphalt is PG 58-28 present in an amount of about 94.5 weight percent based on a total weight of said composition; the non-epoxidized oil is corn oil present in an amount of about 4 weight percent based on a total weight of said composition; the polyolefin is the oxidized high density polyethylene having the weight average molecular weight (Mw) of from about 8,000 to about 12,000 g/mol, the acid number of from about 24 to about 27 mg KOH/g, and the density of from about 0.97 to about 1.0 g/cm$^3$ present in an amount of about 1.5 weight percent based on a total weight of said composition; and the composition has a performance grade of PG 61.2-34.8; or II. the base asphalt is PG 64-22 present in an amount of about 96 weight percent based on a total weight of said composition; the non-epoxidized oil is corn oil present in an amount of about 2.5 weight percent based on a total weight of said composition; the polyolefin is the oxidized high density polyethylene having the weight average molecular weight (Mw) of from about 8,000 to about 12,000 g/mol, the acid number of from about 24 to about 27 mg KOH/g, and the density of from about 0.97 to about 1.0 g/cm$^3$ present in an amount of about 1.5 weight percent based on a total weight of said composition; and the composition has a performance grade of PG 65.2-28.8; or III. the base asphalt is PG 64-22 present in an amount of about 91 weight percent based on a total weight of said composition; the non-epoxidized oil is corn oil present in an amount of about 6 weight percent based on a total weight of said composition; the polyolefin is the oxidized high density polyethylene having the weight average molecular weight (Mw) of from about 8,000 to about 12,000 g/mol, the acid number of from about 24 to about 27 mg KOH/g, and the density of from about 0.97 to about 1.0 g/cm$^3$ present in an amount of about 3 weight percent based on a total weight of said composition; and the composition has a performance grade of PG 64.5-34.3; or IV. the base asphalt is PG 64-22 present in an amount of about 95 weight percent based on a total weight of said composition; the non-epoxidized oil is corn oil present in an amount of about 3 weight percent based on a total weight of said composition; the polyolefin is the low density polyethylene homopolymer having the weight average molecular weight (Mw) of from about 5,000 to about 7,000 g/mol, and the density of from about 0.92 to about 0.94 g/cm$^3$ present in an amount of about 2 weight percent based on a total weight of said composition; and the composition has a performance grade of PG 65.6-29.7; or V. the base asphalt is PG 58-28 present in an amount of about 93 weight percent based on a total weight of said composition; the non-epoxidized oil is corn oil present in an amount of about 5 weight percent based on a total weight of said composition; the polyolefin is the low density polyethylene homopolymer having the weight average molecular weight (Mw) of from about 5,000 to about 7,000 g/mol, and the density of from about 0.92 to about 0.94 g/cm$^3$ present in an amount of about 2 weight percent based on a total weight of said composition; and the composition has a performance grade of PG 58.1-37.6; or VI. the base asphalt is PG 52-34 present in an amount of about 95 weight percent based on a total weight of said composition; the non-epoxidized oil is flux oil present in an amount of about 3 weight percent based on a total weight of said composition; the polyolefin is the low density polyethylene homopolymer having the weight average molecular weight (Mw) of from about 5,000 to about 7,000 g/mol, and the density of from about 0.92 to about 0.94 g/cm$^3$ present in an amount of about 1.2 weight percent based on a total weight of said composition; the composition further comprises about 0.8 weight percent of the maleated polypropylene based on a total weight of said composition, the and the composition has a performance grade of PG 60.3-37.6; or VII. the base asphalt is PG 58-28 present in an amount of about 93 weight percent based on a total weight of said composition; the non-epoxidized oil is corn oil present in an amount of about 5 weight percent based on a total weight of said composition; the polyolefin is the oxidized high density polyethylene having the weight average molecular weight (Mw) of from about 8,000 to about 12,000 g/mol, the acid number of from about 24 to about 27 mg KOH/g, and the density of from about 0.97 to about 1.0 g/cm$^3$ present in an amount of about 2 weight percent based on a total weight of said composition; and the composition has a performance grade of PG 66.6-34.

18. The method of claim 12 wherein

I. the base asphalt is PG 58-28 present in an amount of about 94.5 weight percent based on a total weight of said composition; the non-epoxidized oil is corn oil present in an amount of about 4 weight percent based on a total weight of said composition; the polyolefin is the oxidized high density polyethylene having the weight average molecular weight (Mw) of from about 8,000 to about 12,000 g/mol, the acid number of from about 24 to about 27 mg KOH/g, and the density of from about 0.97 to about 1.0 g/cm$^3$ present in an amount of about 1.5 weight percent based on a total weight of said composition; and the composition has a performance grade of PG 61.2-34.8; or II. the base asphalt is PG 64-22 present in an amount of about 96 weight percent based on a total weight of said composition; the non-epoxidized oil is corn oil present in an amount of about 2.5 weight percent based on a total weight of said composition; the polyolefin is the oxidized high density polyethylene having the weight average molecular weight (Mw) of from about 8,000 to about 12,000 g/mol, the acid number of from about 24 to about 27 mg KOH/g, and the density of from about 0.97 to about 1.0 g/cm$^3$ present in an amount of about 1.5 weight percent based on a total weight of said composition; and the composition has a performance grade of PG 65.2-28.8;

III. the base asphalt is PG 64-22 present in an amount of about 91 weight percent based on a total weight of said composition; the non-epoxidized oil is corn oil present in an amount of about 6 weight percent based on a total weight of said composition; the polyolefin is the oxidized high density polyethylene having the weight average molecular weight (Mw) of from about 8,000 to about 12,000 g/mol, the acid number of from about 24 to about 27 mg KOH/g, and the density of from about 0.97 to about 1.0 g/cm$^3$ present in an amount of about 3 weight percent based on a total weight of said composition; and the composition has a performance grade of PG 64.5-34.3; or IV. the base asphalt is PG 64-22 present in an amount of about 95 weight percent based on a total weight of said composition; the non-epoxidized oil is corn oil present in an amount of about 3 weight percent based on a total weight of said composition; the polyolefin is the low density polyethylene homopolymer having the weight average molecular weight (Mw) of from about 5,000 to about 7,000 g/mol, and the density of from about 0.92 to about 0.94 g/cm$^3$ present in an amount of about 2 weight percent based on a total weight of said composition; and the composition has a performance grade of PG 65.6-29.7; or V. the base asphalt is PG 58-28 present in an amount of about 93 weight percent based on a total weight of said composition; the non-epoxidized oil is corn oil present in an amount of about 5 weight percent based on a total weight of said composition; the polyolefin is the low density polyethylene homopolymer having the weight average molecular weight (Mw) of from about 5,000 to about 7,000 g/mol, and the density of from about 0.92 to about 0.94 g/cm$^3$ present in an amount of about 2 weight percent based on a total weight of said composition; and the composition has a performance grade of PG 58.1-37.6; or VI. the base asphalt is PG 52-34 present in an amount of about 95 weight percent based on a total weight of said composition; the non-epoxidized oil is flux oil present in an amount of about 3 weight percent based on a total weight of said composition; the polyolefin is the low density polyethylene homopolymer having the weight average molecular weight (Mw) of from about 5,000 to about 7,000 g/mol, and the density of from about 0.92 to about 0.94 g/cm$^3$ present in an amount of about 1.2 weight percent based on a total weight of said composition; the composition further comprises about 0.8 weight percent of the maleated polypropylene based on a total weight of said composition, the and the composition has a performance grade of PG 60.3-37.6; or VII. the base asphalt is PG 58-28 present in an amount of about 93 weight percent based on a total weight of said composition; the non-epoxidized oil is corn oil present in an amount of about 5 weight percent based on a total weight of said composition; the polyolefin is the oxidized high density polyethylene having the weight average molecular weight (Mw) of from about 8,000 to about 12,000 g/mol, the acid number of from about 24 to about 27 mg KOH/g, and the density of from about 0.97 to about 1.0 g/cm$^3$ present in an amount of about 2 weight percent based on a total weight of said composition; and the composition has a performance grade of PG 66.6-34.

19. An asphalt composition consisting of:
a base asphalt present in an amount of from about 91 to about 96 weight percent, based on a total weight of said composition and chosen from performance grades PG58-28, PG 64-22, PG 52-34, and combinations thereof;
a non-epoxidized oil chosen from flux oil, corn oil, and combinations thereof, and present in an amount of from about 2.5 to about 5 weight percent, based on a total weight of said composition to improve thermal cracking resistance; and
at least one polyolefin present in a total amount of from about 1.2 to about 3 weight percent, based on a total weight of said composition to improve deformation resistance;
wherein said polyolefin is
a low density polyethylene homopolymer having a weight average molecular weight (Mw) of from about 5,000 to about 7,000 g/mol, and a density of from about 0.92 to about 0.94 g/cm$^3$; or
an oxidized high density polyethylene having a weight average molecular weight (Mw) of from about 8,000 to about 12,000 g/mol, an acid number of from about 24 to about 27 mg KOH/g, and a density of from about 0.97 to about 1.0 g/cm$^3$;
and wherein the asphalt composition may optionally include about 0.8 weight percent of a maleated polypropylene based on a total weight of said composition, wherein said maleated polypropylene has a weight average molecular weight (Mw) of from about 7,000 to about 11,000 g/mol, a saponification number of 75-95 mg KOH/g, and a density of from about 0.92 to about 0.94 g/cm$^3$, and
wherein said asphalt composition has a performance grade of about PG (58.1 to 66.6) and (−28.8 to −37.6), wherein (58.1 to 66.6) is an average seven day maximum pavement design temperature in degrees Celsius and represents deformation resistance and (−28.8 to −37.6) is an average one day minimum pavement design temperature in degrees Celsius and represents thermal cracking resistance, each as determined using AASHTO M320.

20. The composition of claim 19 wherein
I. the base asphalt is PG 58-28 present in an amount of about 94.5 weight percent based on a total weight of said composition; the non-epoxidized oil is corn oil present in an amount of about 4 weight percent based on a total weight of said composition; the polyolefin is the oxidized high density polyethylene having the weight average molecular weight (Mw) of from about 8,000 to about 12,000 g/mol, the acid number of from about 24 to about 27 mg KOH/g, and the density of from about 0.97 to about 1.0 g/cm$^3$ present in an amount of about 1.5 weight percent based on a total weight of said composition; and the composition has a performance grade of PG 61.2-34.8; or II. the base asphalt is PG 64-22 present in an amount of about 96 weight percent based on a total weight of said composition; the non-epoxidized oil is corn oil present in an amount of about 2.5 weight percent based on a total weight of said composition; the polyolefin is the oxidized high density polyethylene having the weight average molecular weight (Mw) of from about 8,000 to about 12,000 g/mol, the acid number of from about 24 to about 27 mg KOH/g, and the density of from about 0.97 to about 1.0 g/cm$^3$ present in an amount of about 1.5 weight percent based on a total weight of said composition; and the composition has a performance grade of PG 65.2-28.8; or III. the base asphalt is PG 64-22 present in an amount of about 91 weight percent based on a total weight of said composition; the non-epoxidized oil is corn oil present in an amount of about 6 weight percent based on a total weight of said composition; the polyolefin is the oxidized high density polyethylene having the weight average molecular weight (Mw) of from about 8,000 to about 12,000 g/mol, the acid number of from about 24 to about 27 mg KOH/g, and the density of from about 0.97 to about 1.0 g/cm$^3$ present in an amount of about 3 weight percent based on a total weight of said composition; and the composition has a performance grade of PG 64.5-34.3; or IV. the base asphalt is PG 64-22 present in an amount of about 95 weight percent based on a total weight of said composition; the non-epoxidized oil is corn oil present in an amount of about 3 weight percent based on a total weight of said composition; the polyolefin is the low density polyethylene homopolymer having the weight average molecular weight (Mw) of from about 5,000 to about 7,000 g/mol, and the density of from about 0.92 to about 0.94 g/cm$^3$ present in an amount of about 2 weight percent based on a total weight of said composition; and the composition has a performance grade of PG 65.6-29.7; or V. the base asphalt is PG 58-28 present in an amount of about 93 weight percent based on a total weight of said composition; the non-epoxidized oil is corn oil present in an amount of about 5 weight percent based on a total weight of said composition; the polyolefin is the low density polyethylene homopolymer having the weight average molecular weight (Mw) of from about 5,000 to about 7,000 g/mol, and the density of from about 0.92 to about 0.94 g/cm$^3$ present in an amount of about 2 weight percent based on a total weight of said composition; and the composition has a performance grade of PG 58.1-37.6; or VI. the base asphalt is PG 52-34 present in an amount of about 95 weight percent based on a total weight of said composition; the non-epoxidized oil is flux oil present in an amount of about 3 weight percent based on a total weight of said composition; the polyolefin is the low density polyethylene homopolymer having the weight average molecular weight (Mw) of from about 5,000 to about 7,000 g/mol, and the density of from about 0.92 to about 0.94 g/cm$^3$ present in an amount of about 1.2 weight percent based on a total weight of said composition; the composition further comprises about 0.8 weight percent of the maleated polypropylene based on a total weight of said composition, the and the composition has a performance grade of PG 60.3-37.6; or VII. the base asphalt is PG 58-28 present in an amount of about 93 weight percent based on a total weight of said composition; the non-epoxidized oil is corn oil present in an amount of about 5 weight percent based on a total weight of said composition; the polyolefin is the oxidized high density polyethylene having the weight average molecular weight (Mw) of from about 8,000 to about 12,000 g/mol, the acid number of from about 24 to about 27 mg KOH/g, and the density of from about 0.97 to about 1.0 g/cm$^3$ present in an amount of about 2 weight percent based on a total weight of said composition; and the composition has a performance grade of PG 66.6-34.

\* \* \* \* \*